May 30, 1944.  C. E. FRASER  2,350,160
FILTERING APPARATUS AND METHOD
Filed June 7, 1940  2 Sheets-Sheet 2
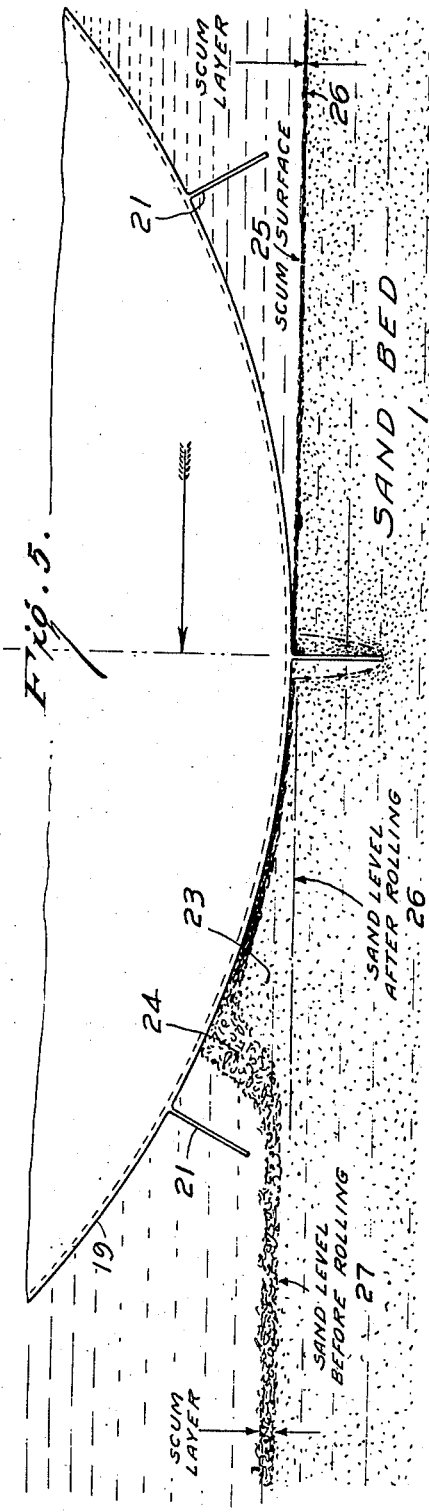
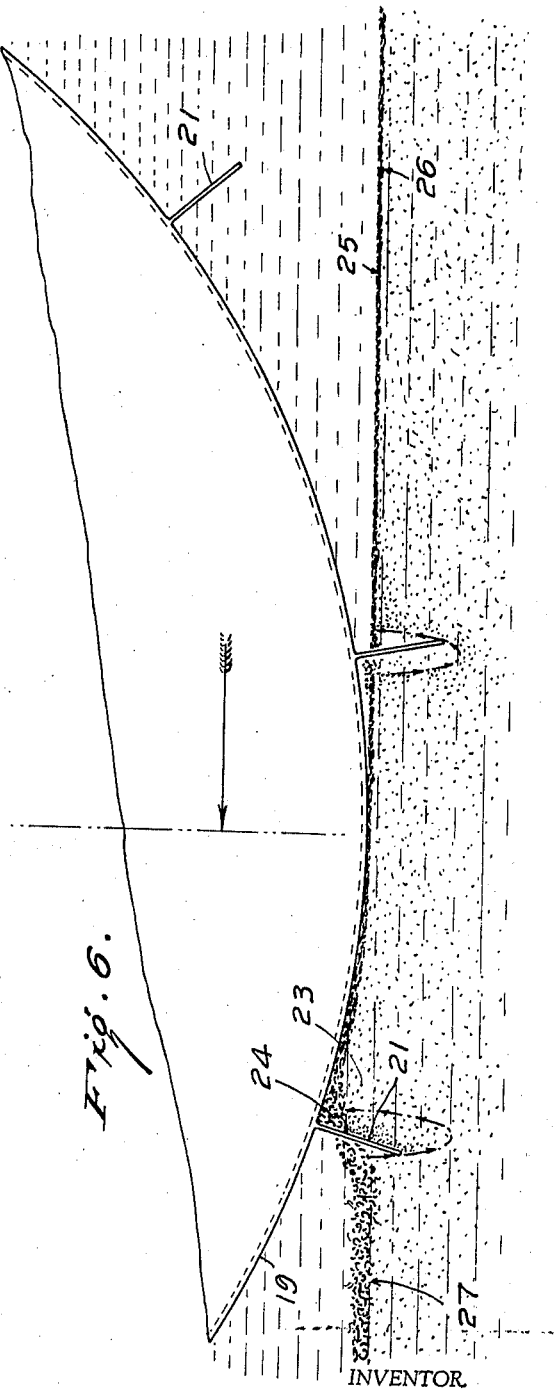
INVENTOR.
CHARLES E. FRASER,
BY Ellis S. Middleton
ATTORNEY.

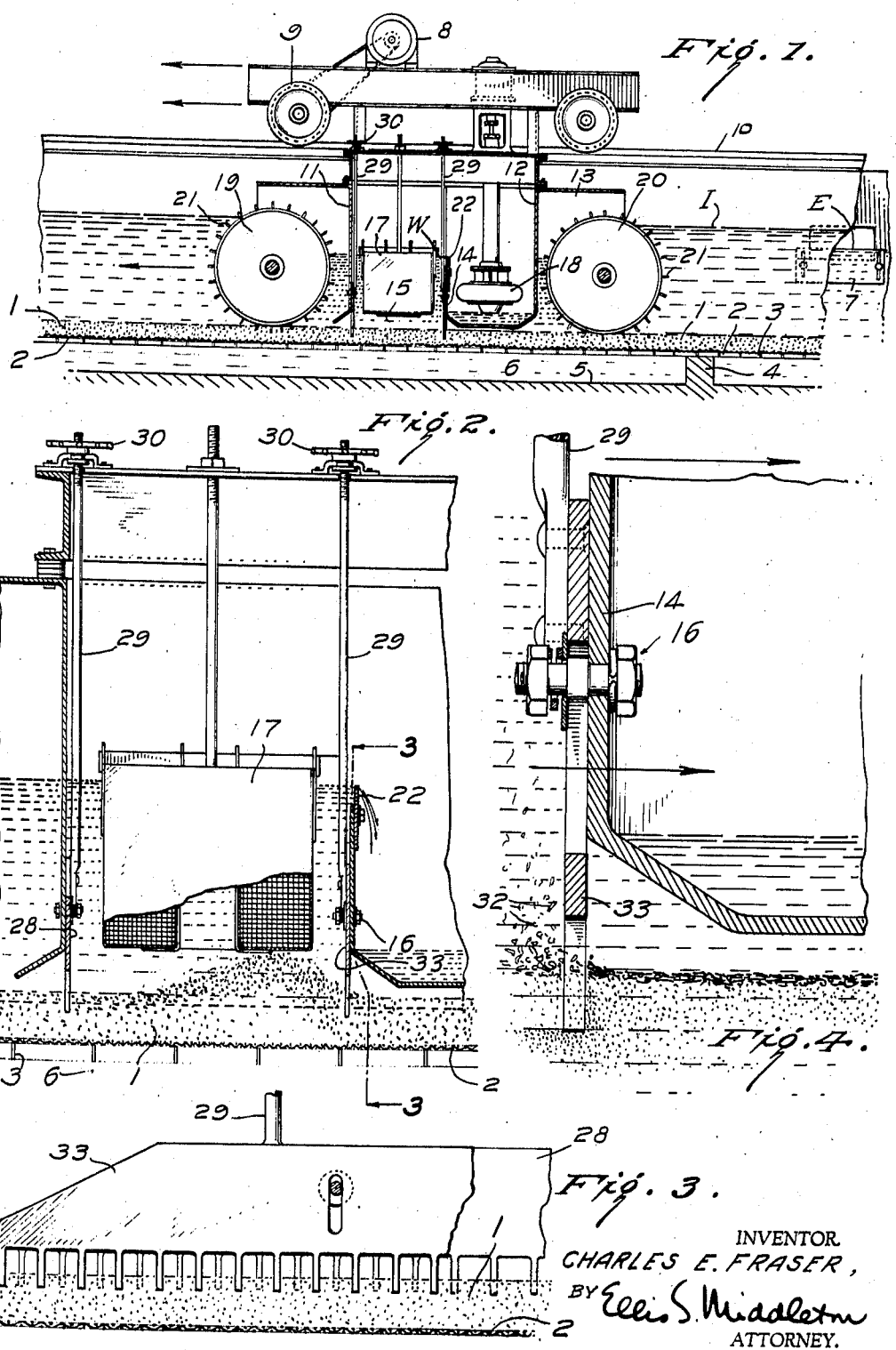

Patented May 30, 1944

2,350,160

UNITED STATES PATENT OFFICE 2,350,160

FILTERING APPARATUS AND METHOD

Charles E. Fraser, Kew Gardens, N. Y.

Application June 7, 1940, Serial No. 339,238

9 Claims. (Cl. 210—128)

The present invention relates to a method of and mechanism for cleaning filter beds.

It is common practice in the treatment of sewage, industrial wastes, etc. to pass liquids containing the same through relatively shallow beds of sand, aggregate or the like, which removes the solids therefrom. Such beds, in the course of time, become clogged with the retained material, even though the raw material undergoing treatment has been subjected to preliminary treatment such as sedimentation or the like. As a consequence, it becomes necessary to restore the bed to somewhere near its initial solid removal capacity and this may be done by cleaning it either intermittently or continuously.

A popular type of cleaning mechanism for the above purpose consists of a travelling cleaner operated above the bed, which includes a cleaner caisson. The caisson is intended to make a sealing contact with the portion of the bed immediately thereunder and this is accomplished usually by extending the side walls of the caisson into the bed material a sufficient distance and by providing sealing means, such as hollow, rotating drums at each end of the caisson and sliding contact along the sides. Consequently, the small portion of the bed which is being cleaned is temporarily completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influent so as to provide a sufficient hydraulic head to cause liquid movement through the bed. As the resistance of a filter bed changes from time to time due to the quantum of retained solids therein, means are provided for varying the hydraulic head between the influent and effluent levels. This usually consists in arranging the parts so that the influent will automatically build up to a higher level than that of the effluent. This may conveniently take the form of an adjustable weir on the effluent discharge. This weir may be automatically operated within a narrow range, by a float on the influent side of the filter.

A convenient method of agitating a portion of the filter bed to clean the same may take the form of an intermittently operated solenoid where the bed material is of the magnetite sand variety. This electromagnet, submerged in the liquid, being located relatively close to the bed, when energized for the space of about a second, lifts a section of the magnetite sand immediately thereunder and this movement and the subsequent dropping of the sand back into the bed, tends to separate the solids caught by the sand therefrom. Inasmuch as the lifting of this magnetite creates a zone of lessened resistance in the bed at that point, if, as in a downflow filter, the effluent level is higher than the wash water level in the solenoid compartment in the caisson, there will be a back rush of clean effluent up through the bed at the area of lessened resistance, which washes the loosened solids from the magnetite, over the partition between the agitation compartment and wash water box and into the latter from which it is removed by a pump. This cleaning procedure may take place continuously.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. Likewise, the cleaner mechanism creates an area of agitation in the bed, but in this case, the flood of water through the area of lessened resistance caused thereby is that of unfiltered influent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, no filtering action takes place in the area covered by the cleaning mechanism.

The main function of the seals is to assist the wash water pump to create a back head and prevent the wash water from contaminating the effluent. In the case of downflow filters, the seals also prevent the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

Actual operations in the field of downflow filters have indicated certain limitations such as the fact that for hydraulic reasons, it is impracticable to deliver to the surface of the bed more than a certain maximum of sewage per square foot of bed per minute, no matter how small the suspended solids content of the sewage may be. This maximum is, therefore, the peak load of the filter bed and the normal rate must consequently be considerably less. The limitation of capacity of upflow filters is even more severe for other reasons, as an excessive rate of upflow lifts the filtering aggregate "en masse" instead of flowing smoothly through the interstices.

Again, it has been found impracticable to operate a submerged cleaner faster than at a certain speed. This is due to the fact that if the cleaner mechanism moves faster than this maximum, it pushes a wall of settled sewage from the top of the bed ahead of it, the movement of which has a tendency to erode the surface of the bed material itself. This disturbance, added to the other hydraulic disturbances of the bed material, is something to be avoided.

Inasmuch as these cleaning devices may not operate as fast as would be desirable under the circumstances, it follows either that the flow of influent must be reduced, additional cleaner must be provided or additional sewage systems or filters installed.

It is the principal object of the present invention, therefore, to provide means whereby the efficiency of these cleaning devices may be stepped up to the point that the beds have increased capacity and, consequently, can take care of greater flow of influent containing a greater quantity of solids than would be possible heretofore, all without increasing the size or number of the cleaning mechanisms themselves and while retaining the beds in their normal area and at uniform level and thickness.

It has been found that the choking of a downflow filter bed is due primarily to the retaining of solids at the surface with which the influent first contacts. That is, the retained solids are not equally distributed throughout the bed material, but on the contrary, form a rather thin film or skin on the bed while the remainder of the bed thickness remains reasonably clean. Under such circumstances, it only becomes necessary to break up this surface film or skin whereupon the bed is restored to nearly its normal capacity. As a consequence, this skin or film breaking procedure supplements the cleaning mechanism and makes it unnecessary for the cleaner to pass over the bed to completely clean the same as often as would be otherwise required. Of course, this surface operation is useful only as a temporary expedient, for eventually the deep cleaner such as above described must be used to cleanse the bed material all the way down to the wire on which it is supported.

It has been found that the normal condition of settled solids upon the surface of a bed and immediately thereunder is that such solids exist as light, fluffy solids only slightly greater in specific gravity than the fluid from which they have been settled. Consequently, such settled solids are easily disturbed and redisseminated through the influent. Therefore, the usual sealing means provided for blocking off an area of the bed during the cleaning operation has a tendency to push ahead of it a wall of, and disturb, the solids in the path of the cleaning mechanism. It has also been found that due to this lack of adhesion and/or cohesion between the solid particles, that in the bed washing apparatus or zone of agitation, they are so completely disseminated as very fine particles that it is most difficult to again settle them out subsequent to removal from the bed.

It has been discovered, however, that if these settled solids caught by the area of the bed to be cleaned can be coagulated or flocculated, that thereafter the flocs or clumps of solids may not only be more readily washed from the bed in comparatively large masses without undue dissemination but that they may be subsequently satisfactorily settled from the wash water.

It will be apparent that any kind of sealing mechanism used in conjunction with a travelling cleaner device has a tendency to disturb the bed at the point of contact and consequently tends to permit leakage of the caught, fine solids through the bed into the clean effluent therebelow. This detrimental action may be prevented by the use of sealing means which at the same time causes a compression of the bed itself. This has the effect of reducing the size of the interstices existing between the particles of the bed material, thus making the bed as a whole more dense. Consequently, there is less liability for the passage of fine particles through the bed at this point into the effluent.

To this end, the invention in one of its aspects contemplates the provision of means travelling ahead of the cleaner which will not only compress the layer of light, settled solids on top of and immediately beneath the bed into a more or less dense and compact mass or film but will at the same time, compress the bed material itself at this point. If this film or compressed mass of solids is then subjected to agitation either in the form of a zone immediately beneath a cleaning mechanism or by means of rakes preceding the cleaner mechanism where the rakes extend only into the compressed area, relatively large flocs of solids are formed which are much more easily removed by the washing apparatus and much more easily settled from the wash water therafter.

Again the invention contemplates the use of an additional rake immediately following in the path of the cleaner apparatus which will have a tendency to restore the level and surface continuity of the bed after a zone of agitation has been created therein, the solids washed and removed therefrom and the bed permitted to settle again. Such rakes have the effect of leveling out any hills, valleys or other unevenness in the bed, all of which makes for more efficient operation of the filter media.

Obviously, such a method and apparatus are equally applicable to beds of both the rectangular and annular varieties, in the former of which the cleaning mechanism moves back and forth over the bed while in the latter the apparatus moves round and round, usually in one direction.

The invention further consists in the novel arrangement, combination and construction of parts more fully hereinafter shown in the drawings, in which—

Fig. 1 is a side elevation partly in section of an apparatus embodying the present invention;

Fig. 2 is an enlarged detail of an agitation creating means together with the rakes movable ahead of and behind the agitation means;

Fig. 3 is a fragmentary front view of one form of rake;

Fig. 4 is a fragmentary sectional enlarged view showing the manner of attachment of a rake to a cleaner caisson;

Fig. 5 is a fragmentary side elevation of one form of compression means showing its action on the settled solids and bed;

Fig. 6 is a view similar to Fig. 5 showing the compression means as having moved forward over the bed a limited extent from the position of Fig. 5.

Referring now to Fig. 1, the usual filter bed is shown at 1 of sand, such as that of the magnetite or silica variety or any other aggregate or filter media. A suitable thickness of bed material rests upon a screen 2 supported by grid 3 resting upon the top of wall 4 so as to slightly space the grid from the bottom 5 of the filter tank. The space 6 serves as an effluent channel for the clean filtered material.

Influent to be filtered either with or without preliminary treatment such as sedimentation or the like is flowed on top of the bed 1 until a suitable level I above the adjustable effluent level E has been reached. This hydraulic head causes movement of the liquid to be filtered through the bed 1, the latter retaining the solids so that the clean effluent flows into the space 6 beneath the bed. The clean effluent then passes upwardly through a vertical channel and spills over an adjustable weir 7 which establishes the effluent level E lower than the influent level I. Adjustment of the weir 7 may be made at will and by any suitable means not shown to determine the relationship between these levels.

A suitable cleaning mechanism may consist of a trolley movable by motor 8 through wheels 9 mounted on a trackway 10. Depending from the trolley is a caisson consisting of a front wall 11, a rear wall 12 and side walls 13. A partition 14 divides the caisson into an agitation compartment 15 and a wash water compartment 16. In the former is a solenoid 17 or other agitation causing means while in the latter a pump 18 is located for removing wash water therefrom.

The caisson makes a sealing contact with the filter bed for the purpose above described and this may be accomplished at the sides by extending the side walls 13 into the bed material a sufficient distance, and at each end through the instrumentality of forward roller 19 and rear roller 20 suitably carried in the side walls 13 and making a water-tight sliding connection therewith. The rollers are provided with a series of cleats 21 on the periphery thereof not only to facilitate a sealing contact with the bed but for the purpose of trapping the forward moving wave of bed material and settled solids.

The solenoid 17 may be connected to a suitable intermittent source of electrical energy so as to energize the same. Upon establishing this connection, where the sand of the filter bed is of the magnetite variety, the latter is magnetized and an area thereof bodily lifted up toward the solenoid, which loosens the dirt adherent to the sand. It is to be noted that by suitable adjustment of the relative height of the solenoid or the degree of magnetic force created therein, any amount of bed may be lifted from a small amount to one completely down to the wire.

Assuming that a section of the bed down to the wire is lifted, this causes an area of agitation and weakened resistance in the bed and due to the fact that the wash water level W in the wash water caisson established by reason of adjustable weir 22 in intermediate wall 14 is lower than that of the effluent level E, clean effluent from below the bed flows up through this area of lessened resistance, washes the dirt loosened from the sand and spills the thus produced wash water over the top of weir 22 into the wash water compartment 16 from which it is removed by the pump 18. When the solenoid 17 is de-energized, it releases the magnetite which drops back into the bed substantially clean. The deep cleaning operation is then repeated intermittently until the entire area of the bed has been subjected to the purging action.

It will be observed that by the use of a roller of suitable weight travelling ahead of the cleaning mechanism as particularly shown in Fig. 5, there will be a tendency for a wave 23 of bed material and a wave 24 of settled solids to move ahead of the roller. Unless means are provided to prevent this action, not only does the bed material gradually thin out in the center of rectangular beds but it is caused to build up to an undue extent at the ends thereof. Moreover, the wave 24 of settled solids being comparatively light and uncompacted will be disturbed and disseminated throughout the influent liquid so that they cannot be efficiently removed in the subsequent cleaning operation.

As shown in Fig. 5, the cleat 21 moves down ahead of the advancing walls of sand 23 and solids 24, traps them as in Fig. 6 and finally compresses the solids into a compact layer 25 while at the same time leaving the sand at a level 26, lower than that of its level 27 prior to passage of the roller 19. In this compression period, some of the loose solids on top of the bed have been pushed into, and below the surface of, the sand so that with the exception of the compressed film 25, the majority of solids are included in the top portion of the bed.

Not only does the cleat action prevent the segregation of bed material by trapping the moving wave thereof but it also avoids the disturbance of the settled solids by passage of the roller thereover.

Referring back to Figs. 1, 2 and 3, it will be observed that as the cleaner progresses in the path of the roller 19, a rake 28 carried by support 29 which is mounted for adjustable vertical movement by means of the handwheel 30 breaks up the compacted layer of solids 25 by means of its teeth 31. This causes the formation of flocs 32 as well as plows the upper one-third of the bed carrying the majority of compacted bed material and solids. When, therefore, the solenoid 17 is energized, the loosened bed material is lifted from the screen 2 and the upflowing clean effluent from below carries the flocs and their dirt over the top of weir 22 into the wash water compartment 16 from which it may be removed.

After the solenoid has become deenergized so as to drop the magnetite back into its place on the screen 2, any unevenness in the surface thereof is leveled out by means of the teeth of rake 33 attached to the wall 14. It is preferable to stagger the teeth in rakes 28 and 33.

While the above operation has been described with relation to movement of the cleaning device in one direction, yet its operation is similar when moved in the opposite direction.

As a result of the above instrumentalities a much more efficient cleaning operation is obtainable than has been possible heretofore, due primarily to the formation of a compacted layer of solids and bed. This is a much more advantageous operation than has been heretofore accomplished, where, for instance, sliding shoes and buoyant drums have been used either to make a sealing contact with the sand or to support the movable cleaner mechanisms. Unless there is a definite deliberate weight placed upon the bed, compression of the surface and adjacent solids and bed cannot be accomplished.

I claim:

1. A method of cleaning a downflow filter bed which includes segregating an area of the bed, compacting the solids caught by the upper portion of the bed, as the filtrant flows downwardly through it, in the segregated area substantially completely across the bed while at the same time compacting the bed itself so that the solids are pressed into the bed and compacted onto the bed in a dense film, thereafter raking the upper compacted surface only of the compacted area of the bed and subsequently lifting portions of the bed which have been raked in said segregated area and washing out and removing the solids therefrom.

2. A method of cleaning a downflow filter bed which includes segregating an area of the bed, compacting the solids caught by the upper portion of the bed, as the filtrant flows downwardly through it, in the segregated area substantially completely across the bed while at the same time compacting the bed itself, so that the solids are pressed into the bed and compacted onto the bed in a dense film, thereafter raking the upper compacted layer only of the bed to break the compacted solids into flocs and subsequently creating a zone of agitation in the flocced segregated area of the bed which has been raked and washing out and removing the solids therefrom.

3. A method of cleaning a downflow filter bed which includes segregating an area of the bed, compacting solids caught by the upper portion of the bed, as the filtrant flows downwardly through it, in the segregated area substantially completely across the bed while at the same time compacting the bed itself so that the solids are pressed into and compacted onto the bed in a dense film, raking the upper one-third thickness only of the compacted bed to form flocs, thereafter lifting portions of the flocced segregated area of the bed which has been raked and washing out and removing the solids therefrom.

4. A method of cleaning a downflow filter bed in which the filtrant flows downwardly through it, which includes segregating an area of the bed, compacting the solids caught by the upper portion of the bed, as the filtrant flows downwardly through it, in an area substantially completely across the bed while at the same time compacting the bed itself, so that the solids are pressed into and compacted onto the bed in a dense film, raking the upper compacted surface only of the compacted bed, thereafter lifting portions of the raked segregated area of the bed and washing out and removing the solids therefrom.

5. In combination, travelling means extending substantially completely across a filter bed and in contact therewith to compact the bed and the solids caught by the upper portion thereof, a rake extending downwardly through the compacted bed area only traveling behind and in the path of the compacting means to break up the compacted solids into flocs, means to create a zone of agitation in and beneath the flocced area of the bed, which has been raked, by raising portions thereof, and means for washing out and removing the solids from the said zone.

6. The combination of claim 5 in which the compacting means is a roller.

7. The combination of claim 5 in which the compacting means is a cleated roller.

8. The combination of claim 5 with an additional rake travelling behind the zone of agitation to level the bed.

9. A method of cleaning a downflow filter bed which includes segregating an area of the bed, compacting the solids caught by the upper portion of the bed, as the filtrant flows downwardly through it, in the segregated area substantially completely across the bed while at the same time compacting the bed itself, so that the solids are pressed into the bed and compacted onto the bed in a dense film, thereafter raking the upper compacted layer only of the bed to break the compacted solids into flocs and subsequently creating a zone of agitation, extending completely to the bottom of the bed, in the flocced segregated area of the bed which has been raked and washing out and removing the solids therefrom.

CHARLES E. FRASER.